United States Patent [19]
Gibson

[11] Patent Number: 6,035,767
[45] Date of Patent: Mar. 14, 2000

[54] CAMPING SKILLET AND BISCUIT MAKER

[76] Inventor: Ronald E. Gibson, 5455 Buttermilk Rd., Lenoir City, Tenn. 37771

[21] Appl. No.: 08/873,496

[22] Filed: Jun. 12, 1997

[51] Int. Cl.[7] .............................. A47J 27/00; A47J 37/00
[52] U.S. Cl. ................................ 99/424; 99/403; 99/413; 99/415; 99/417; 99/426; 99/449; 99/450
[58] Field of Search ..................... 99/339, 340, 422–425, 99/426, 407–417, 375–378; 220/4.22, 4.24, 23.2, 573.1; D7/357; 126/25 R, 9 R, 41 R; 219/386, 474, 521–525, 533

[56] References Cited

U.S. PATENT DOCUMENTS

| | | | |
|---|---|---|---|
| 386,599 | 7/1888 | Neville | 99/424 |
| 924,336 | 6/1909 | French | 99/424 |
| 933,545 | 9/1909 | French | 99/424 |
| 993,169 | 5/1911 | Hudson | 99/424 |
| 1,010,887 | 12/1911 | French | 99/424 |
| 1,072,892 | 9/1913 | Wilson . | |
| 1,107,987 | 8/1914 | Nash . | |
| 1,204,682 | 11/1916 | Nash . | |
| 1,292,476 | 1/1919 | Kavanagh . | |
| 1,410,818 | 3/1922 | McCargah | 99/424 |
| 1,957,133 | 5/1934 | Davis | 99/424 |
| 2,526,227 | 10/1950 | Grundstorm . | |
| 4,773,316 | 9/1988 | Dougherty | 99/409 |
| 5,615,604 | 4/1997 | Chenglin | 99/375 X |

*Primary Examiner*—Timothy Simone
*Attorney, Agent, or Firm*—Pitts & Brittian, P.C.

[57] ABSTRACT

A camp skillet and biscuit maker, (10) primarily useful for cooking biscuits, meats and other food items at a campsite over a direct heat source, such as a camp fire or camp stove. Biscuit maker (10) includes an upper skillet member (20) and a lower skillet member (30). Upper skillet member (20) and lower skillet member (30) are hingedly fixed together. Lower skillet member (30) is of sufficient depth to serve as a deep fryer and a fry basket (65), is provided that is dimensioned so as to nest within lower skillet member (30). For cooking biscuits over a camp fire, biscuit skillet (70), which has a foraminous bottom (72), which also nests within lower skillet member (30) is provided.

18 Claims, 6 Drawing Sheets

CAMPING SKILLET AND BISCUIT MAKER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention relates to the field of cooking utensils. More particularly, it relates to an improved camping skillet that is also useful for cooking biscuits over direct heat.

2. Description of the Related Art

Camping is, and has been for many years, a popular recreational activity. Camping often requires cooking over direct heat, such as over a gas stove or a camp fire. And, many utensils have been designed for such cooking. In this regard, U.S. Pat. No. 1,072,892 issued to J. H. Wilson on Sep. 9, 1913 discloses a folding skillet. U.S. Pat. No. 1,107,987 issued to T. J. Nash on Aug. 18, 1914 discloses a folding griddle in which pancakes may be easily turned from side to side. U.S. Pat. No. 1,204,682 issued to T. J. Nash on Nov. 14, 1916 discloses a further folding griddle in which pancakes may be easily turned from side to side. U.S. Pat. No. 1,292,476 issued to W. Kavanagh on Jan. 28, 1919, discloses a folding omelet pan. Finally, U.S. Pat. No. 2,526,227 discloses an aluminum alloy useful for making cast aluminum cooking utensils. A commercial device cast in accordance with the teachings of the '227 patent and which appears to be of similar construction as the '892 patent is marketed by "MIRACLE MAID COOKWARE". However, what has been missing from the art is a camp skillet that has a hinged lid with an insert having a foraminous bottom for cooking biscuits or steaming vegetables, and an additional wire basket insert useful for deep frying.

Accordingly, it is an object of the present invention to provide an improved camp skillet and biscuit maker.

It is a further object of the present invention to provide a camp skillet that is deep enough to be useful for deep frying and that has an insert fry basket.

A further object of the present invention is to provide a camp skillet that has an additional insert having a foraminous bottom for cooking biscuits.

Still another object of the present invention is to provide a camp skillet in which the component inserts can be stored in the camp skillet for easy storage and transportation.

Other objects and advantages over the prior art will become apparent to those skilled in the art upon reading the detailed description together with the drawings as described as follows.

BRIEF SUMMARY OF THE INVENTION

In accordance with the various features of this invention, a camp skillet and biscuit maker is provided. The camp skillet and biscuit maker includes two skillet members that are hingedly fixed together. In the preferred embodiment, this hinge is adapted with quick release pins for easy removal of the second skillet member. Both skillet members are provided with handles constructed of a lightweight, non-heat conducting material. The first skillet member is of sufficient depth to serve as a deep fryer and a first insert is provided to act as a deep fryer basket. The second skillet member is shallower and serves as a camp biscuit maker. In this regard, a second insert is provided that has a foraminous bottom and is of substantially the same depth as the second skillet member. This insert is used for biscuit making and allows the biscuits to be turned from side to side by flipping the camp skillet. This insert can also be used to steam vegetables and certain meats.

In the preferred embodiment, the deep fryer basket insert and the biscuit maker insert are adapted so as to be received in the camp skillet for cooking and for storage and transportation. Also, while the camp skillet can be constructed of cast iron, the preferred camp skillet is constructed of cast aluminum to be lightweight.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
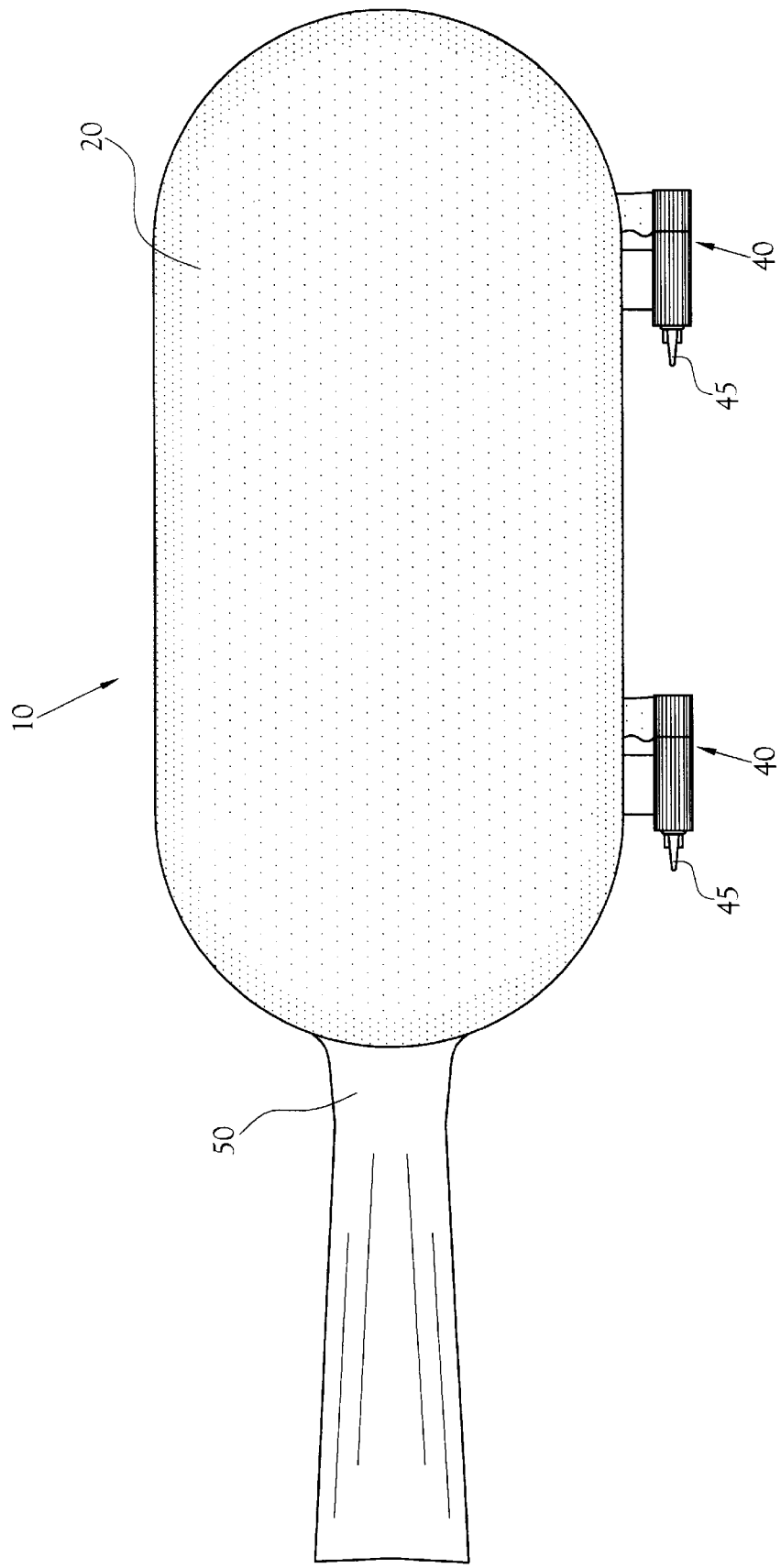
FIG. 1 illustrates a top plan view of the camp skillet and biscuit maker of the present invention.
Figure 2:
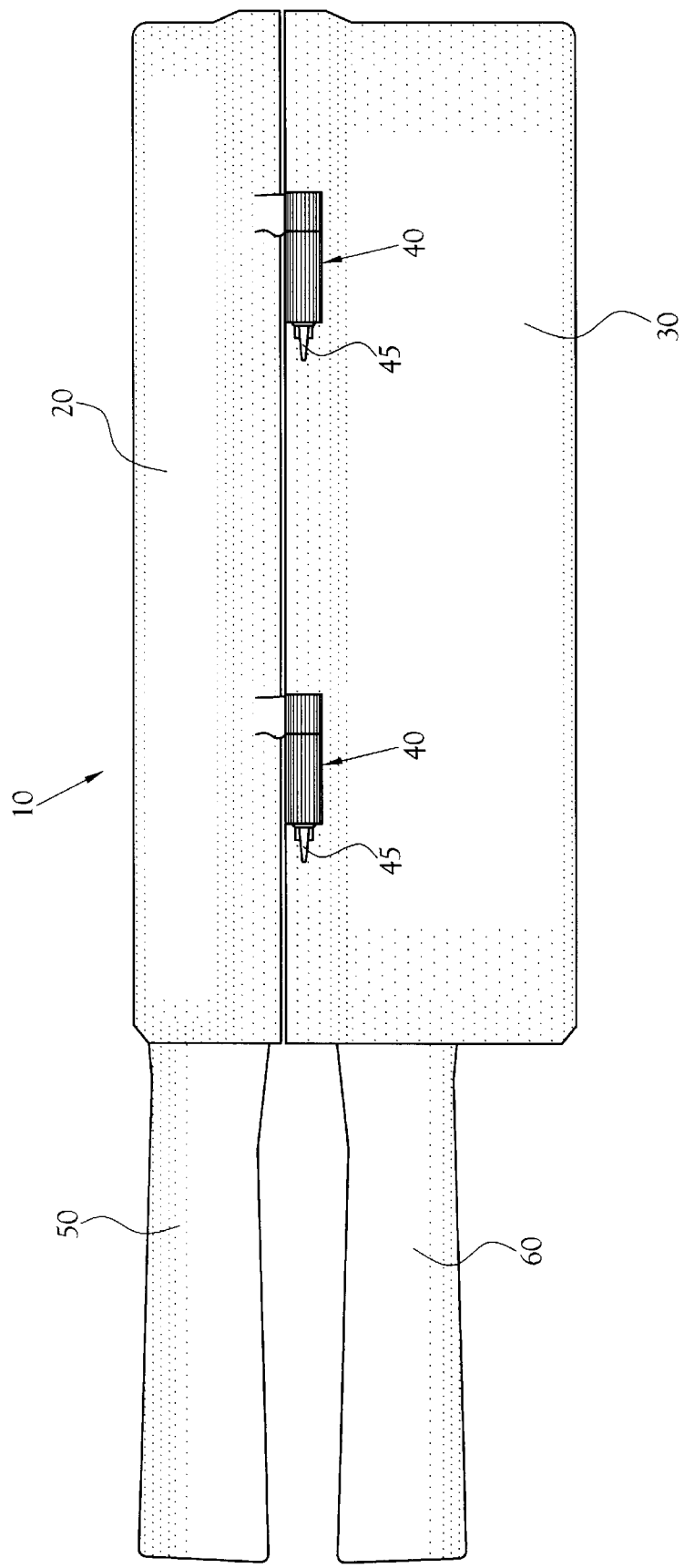
FIG. 2 illustrates a side elevation view of the camp skillet and biscuit maker showing the hinges with the quick release pins.

A camp skillet and biscuit maker, (hereinafter referred to as "biscuit maker"), constructed in accordance with the present invention, is illustrated generally as 10 in the figures. Biscuit maker 10 is primarily useful for cooking biscuits, meats and other food items at a campsite over a direct heat source, such as a camp fire or camp stove.

Biscuit maker 10 includes an upper skillet member 20 and a lower skillet member 30. Upper skillet member 20 and lower skillet member 30 are hingedly fixed together by hinges 40. In the preferred embodiment, hinge 40 is adapted with quick release pins 45 for easy removal of the upper skillet member 20 from lower skillet member 30.

Upper skillet member 20 is provided with a handle 50 that, preferably, is constructed of a lightweight, non-heat conducting material. Likewise, lower skillet member 30 is also provided with a handle 60 that is also constructed of the same non-heat conducting material.

Figure 3:
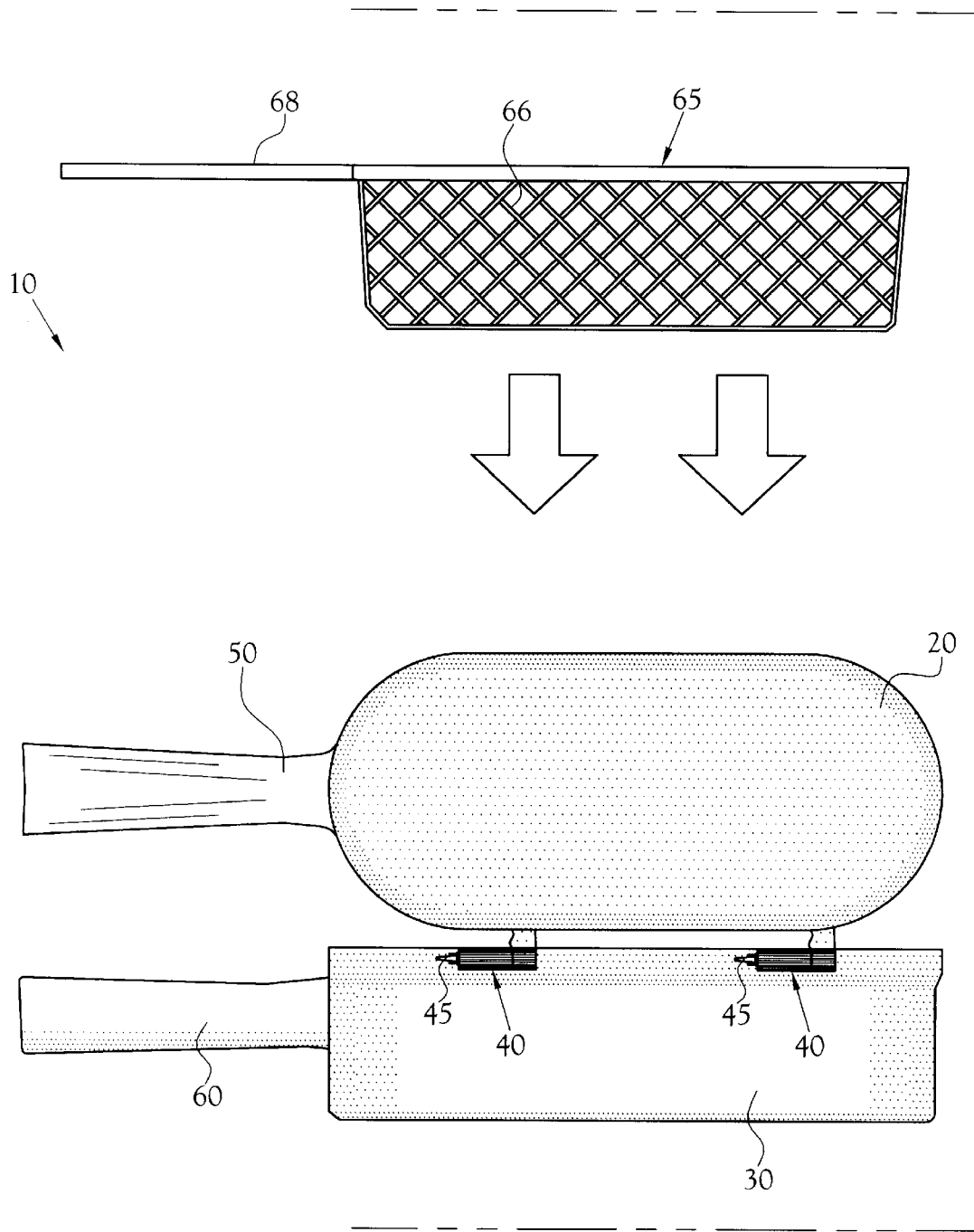
FIG. 3 illustrates a side elevation view showing the lid of the camp skillet and biscuit maker in the open position and showing the basket insert to be used as a deep fryer basket.
Figure 4:
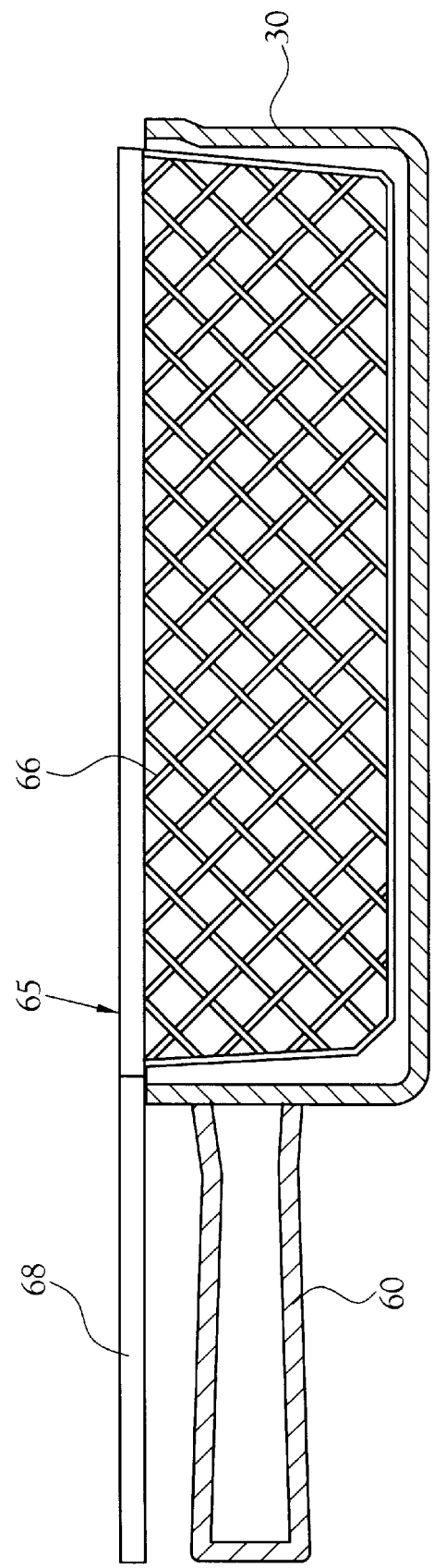
FIG. 4 is a partial cross section view of the camp skillet and biscuit maker showing the basket insert nested within the first skillet member.
Figure 5A:
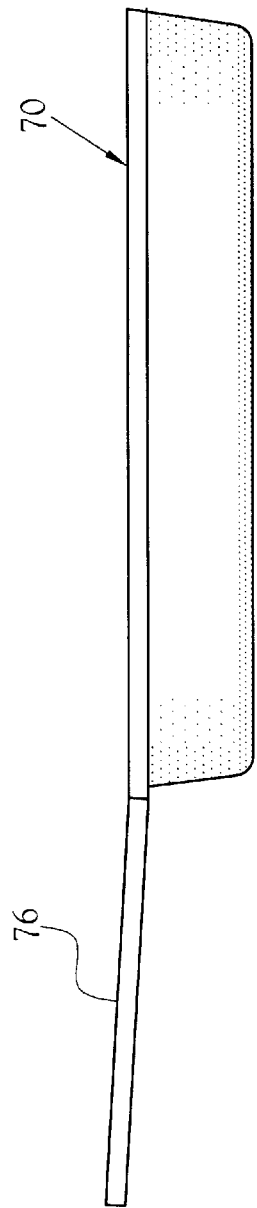
FIG. 5a and 5b illustrate a side elevation and top plan view, respectively, of the biscuit skillet/steamer insert of the present invention.
Figure 5B:
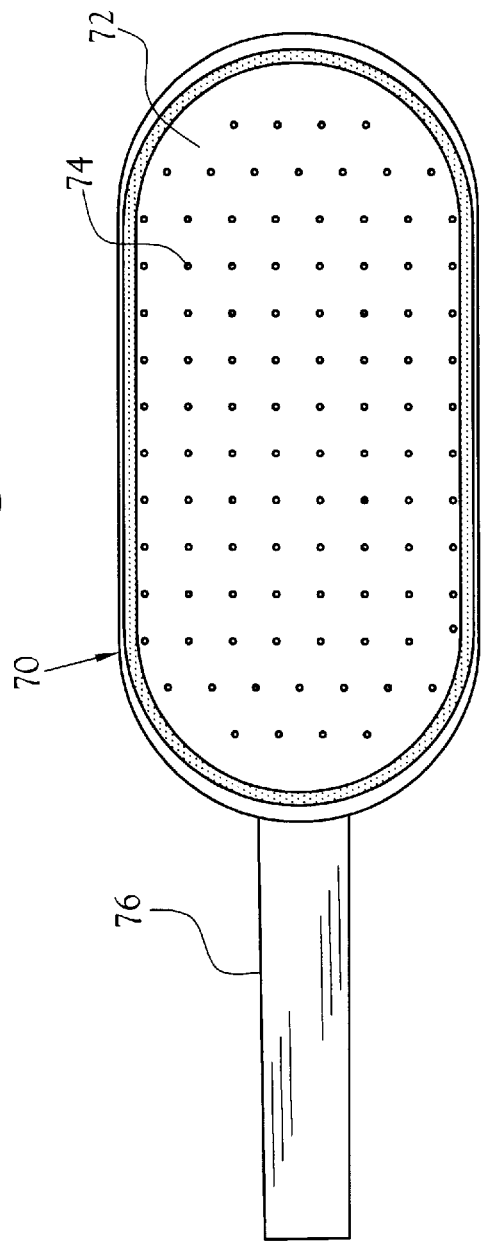

Lower skillet member 30 is of sufficient depth to serve as a deep fryer and a first insert, referred to as fry basket 65, is provided to act as a deep fryer basket. Fry basket 65 is provided with a handle 68 for grasping. Those skilled in the art will appreciate that the body of fry basket 65 is constructed of a plurality of woven wires 66. Fry basket 65 is dimensioned so as to nest within lower skillet member 30 as shown in FIGS. 3 and 4.

Figure 6:
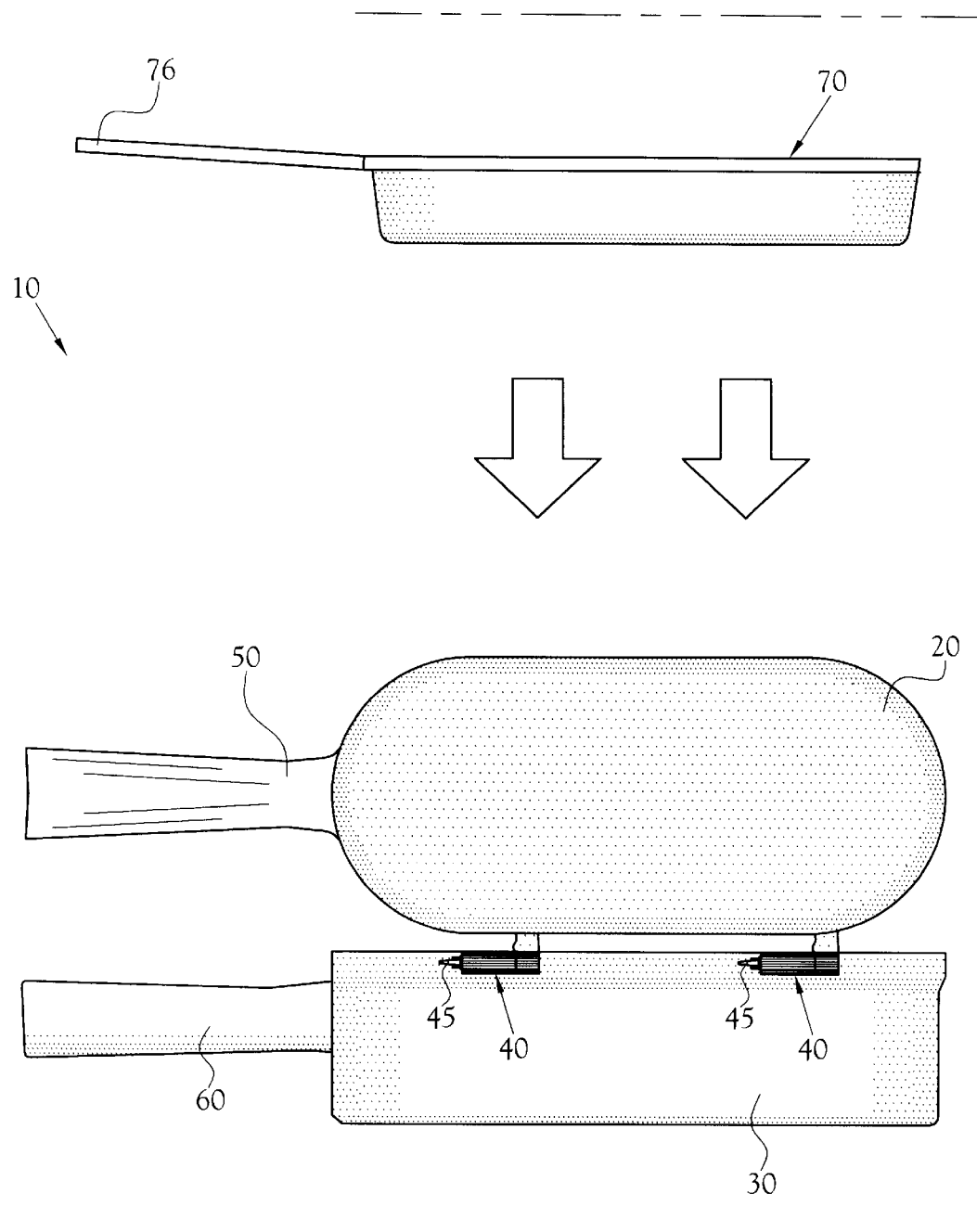
FIG. 6 illustrates a side elevation view showing the lid of the camp skillet and biscuit maker in the open position and showing the biscuit skillet/steamer insert.

Upper skillet member 20 is shallower than lower skillet member 30. For cooking biscuits over a camp fire, a skillet member insert, referred to as biscuit skillet 70, is provided which also nests within lower skillet member 30 as shown in FIG. 6. Biscuit skillet 70 has a foraminous bottom 72. In this regard, the bottom of biscuit skillet 70 is provided with a plurality of foramina 74. Biscuit skillet 70 is also provided with a graspable handle member 76. Biscuit skillet 70 is dimensioned so as to be substantially the same depth as the upper skillet member 20. Accordingly, biscuit skillet 70 has substantially less depth than lower skillet member 30 thus creating an air space between biscuit skillet 70 and lower skillet member 30 for indirect heating of food items, such as biscuits, contained within biscuit skillet 70. This arrangement also allows the biscuits to be turned from side to side by flipping biscuit maker 10. Biscuit skillet 70 can also be used to steam vegetables and certain meats.

In the preferred embodiment, fry basket 65 and biscuit skillet 70 are adapted so as to be received in lower skillet member 30 both during cooking as described above and for storage and transportation. Also, while biscuit maker 10 and biscuit skillet 70 can be constructed of any cast metal, such as cast iron, in the preferred embodiment biscuit maker 10 and biscuit skillet 70 are constructed of cast aluminum to be lightweight.

From the foregoing description, it will be recognized by those skilled in the art that a camp skillet and biscuit maker offering advantages over the prior art has been provided. Specifically, the camp skillet and biscuit maker provides an improved camp skillet and biscuit maker that is deep enough to be useful for deep frying and that includes a fry basket and an additional insert having a foraminous bottom for cooking biscuits. The present invention also provides an improved camp skillet and biscuit maker in which the component inserts can be stored in the camp skillet for easy storage and transportation.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,

I claim:

1. An improved camp skillet comprising:
   a lower skillet member having a graspable handle;
   an upper skillet member having a graspable handle, said upper skillet member being hingedly fixed to said lower skillet member by means of hinges carried by said lower skillet member and said upper skillet member, said hinges including quick release pins for facilitating removal of said upper skillet member from said lower skillet member; and
   at least one insert member dimensioned for being received by, and nesting within, said lower skillet member, said insert member having a graspable handle.

2. The improved camp skillet of claim 1 wherein said insert member defines a wire basket member.

3. The improved camp skillet of claim 1 wherein said insert member defines a biscuit skillet member, said biscuit skillet member having a foraminous bottom.

4. The improved camp skillet of claim 3 wherein said lower skillet member, said upper skillet member and said biscuit skillet member are each conducted of a cast metal.

5. The improved camp skillet of claim 4 wherein said lower skillet member, said upper skillet member and said biscuit skillet member are each conducted of cast aluminum.

6. The improved camp skillet of claim 1 wherein said graspable handle of said lower skillet member, said graspable handle of said upper skillet member, said graspable handle of said insert member are each constructed from a lightweight, non-heat conducting material.

7. The improved camp skillet of claim 3 wherein said lower skillet member has a first depth, said upper skillet member has a second depth, said first depth being greater than said second depth.

8. The improved camp skillet of claim 7 wherein said biscuit skillet member has a third depth, said second depth and said third depth being substantially equal.

9. An improved camp skillet comprising:
   a lower skillet member having a graspable handle constructed from a non-heat conducting material;
   an upper skillet member having a graspable handle constructed from a non-heat conducting material, said upper skillet member being hingedly fixed to said lower skillet member by means of hinges carried by said lower skillet member and said upper skillet member, said hinges including quick release pins for facilitating removal of said upper skillet member from said lower skillet member;
   a wire basket member dimensioned for being received by, and nesting within, said lower skillet member, said wire basket member having a graspable handle constructed from a non-heat conducting material; and
   a biscuit skillet member dimensioned for being received by, and nesting within, said lower skillet member, said biscuit skillet member having a graspable handle constructed from a non-heat conducting material and further having a foraminous bottom.

10. The improved camp skillet of claim 9 wherein said lower skillet member, said upper skillet member and said biscuit skillet member are each conducted of a cast metal.

11. The improved camp skillet of claim 10 wherein said lower skillet member, said upper skillet member and said biscuit skillet member are each conducted of cast aluminum.

12. The improved camp skillet of claim 9 wherein said lower skillet member has a first depth, said upper skillet member has a second depth, said first depth being greater than said second depth.

13. The improved camp skillet of claim 12 wherein said biscuit skillet member has a third depth, said second depth and said third depth being substantially equal.

14. An improved camp skillet comprising:
   a lower skillet member having a graspable handle, said lower skillet member having a first depth;
   an upper skillet member having a graspable handle, said upper skillet member being hingedly fixed to said lower skillet member by means of hinges carried by said lower skillet member and said upper skillet member, said upper skillet member having a second depth wherein said second depth is less than said first depth;
   a wire basket member dimensioned for being received by, and nesting within, said lower skillet member, said wire basket member having a graspable handle; and
   a biscuit skillet member dimensioned for being received by, and nesting within, said lower skillet member, said biscuit skillet member having a graspable handle and further having a foraminous bottom, said biscuit skillet member having a third depth substantially equal to said second depth.

15. The improved camp skillet of claim 14 wherein said hinges are provided with quick release pins thereby allowing said upper skillet member to be removed from said lower skillet member.

16. The improved camp skillet of claim 14 wherein said lower skillet member, said upper skillet member and said biscuit skillet member are each conducted of a cast metal.

17. The improved camp skillet of claim 16 wherein said lower skillet member, said upper skillet member and said biscuit skillet member are each conducted of cast aluminum.

18. The improved camp skillet of claim 14 wherein said graspable handle of said lower skillet member, said graspable handle of said upper skillet member, said graspable handle of said wire basket member and said graspable handle of said biscuit skillet member are each constructed from a lightweight, non-heat conducting material.

\* \* \* \* \*